May 17, 1927.
A. D. UPDEGRAFF
1,628,814
FROST EXTERMINATING MEANS FOR WINDSHIELDS
Filed Dec. 23, 1926    3 Sheets-Sheet 1
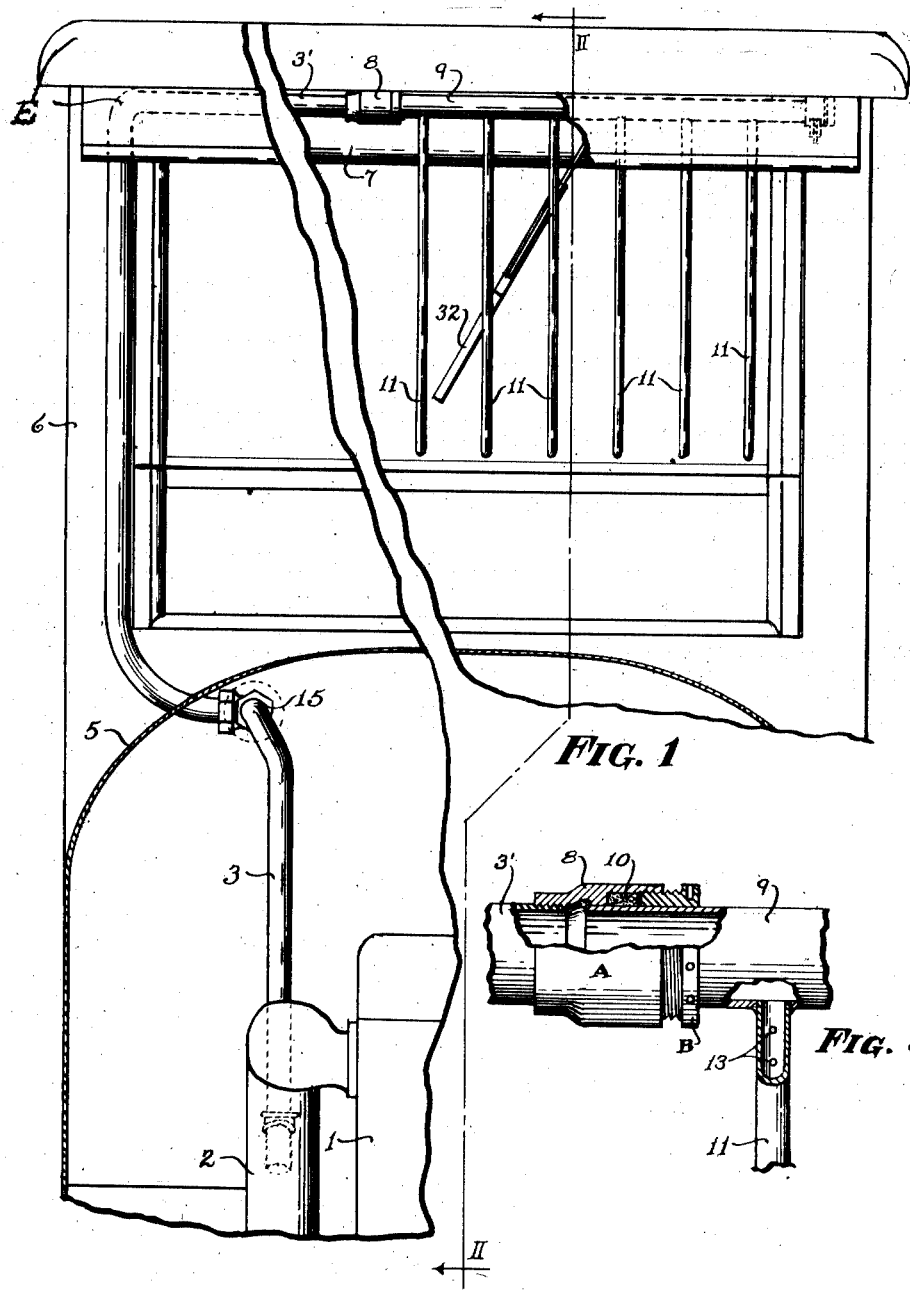
INVENTOR.
Alpha D. Updegraff
BY
U. G. Charles
ATTORNEY.

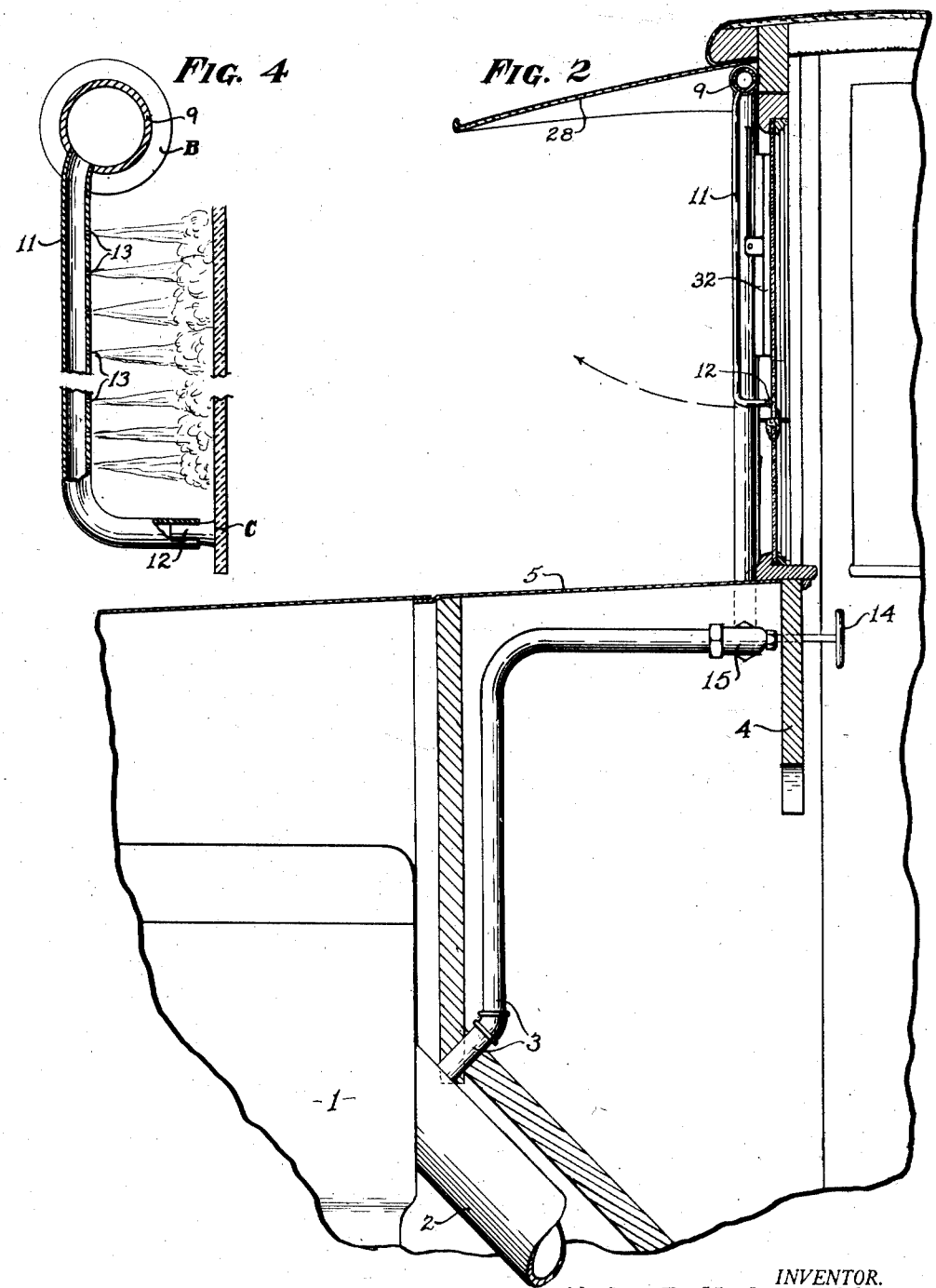

May 17, 1927.

A. D. UPDEGRAFF 1,628,814

FROST EXTERMINATING MEANS FOR WINDSHIELDS

Filed Dec. 23, 1926   3 Sheets-Sheet 3

INVENTOR.
Alpha D. Updegraff
BY
ATTORNEY.

Patented May 17, 1927.

1,628,814

UNITED STATES PATENT OFFICE.

ALPHA D. UPDEGRAFF, OF VALLEY CENTER, KANSAS.

FROST-EXTERMINATING MEANS FOR WINDSHIELDS.

Application filed December 23, 1926. Serial No. 156,636.

My invention relates to frost exterminating means for wind shields, such as commonly are used on motor driven vehicles.

The object of my invention is to prevent the accumulation of ice or snow on the wind shield while driving the vehicle.

A further object of my invention is to provide a mechanism that is removable by rocking to a horizontal position.

A still further object of my invention is to provide a mechanism that will utilize the heat created by the engine.

A still further object of my invention is to provide a mechanism that when placed in operative position will not interfere with the movement of a wind shield wiper.

These and other objects will be hereinafter more fully explained.

Fig. 1 is a fragmentary front view of an automobile, parts removed for convenience of illustration.

Fig. 2 is a sectional view taken along the lines II—II in Fig. 1.

Fig. 3 is an enlarged detail view of the union functioning as a swivel.

Fig. 4 is an enlarged detail view of the jet pipe in its working position, relative to the wind shield.

Figure 6:
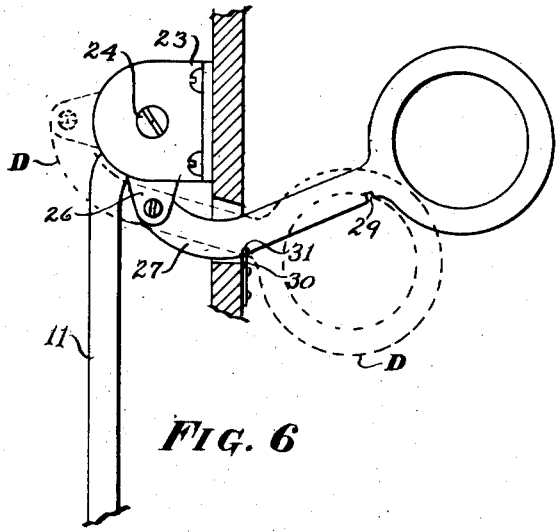
Fig. 6 is a transverse view of Fig. 5.

In Fig. 2 is shown the engine 1 and its exhaust, manifold 2. Threadedly engaging in an aperture through the manifold is a pipe 3, the said pipe extending upward and outward within close proximity to the instrument board, and from thence passing through the hood 5, then upward along the corner post 6 and across on the frame 7 above the wind shield connecting with a union 8, the said union functioning as a swivel for the distribution pipe 9, the said union consisting of a member A threadedly engaging on the pipe 3', threadedly engaging in the opposite end of said member is a collar B, the said collar snugly engaging on the distribution pipe 9.

As means for securing the joint between said pipes a packing 10 is positioned in member A as shown in Fig. 3. By applying a span wrench to the member B the said member is screwed firmly on the packing, closing the joint around pipe 9, at the same time permitting the said pipe to rotate as hereinafter described.

Laterally extending from the distribution pipe is a plurality of pipes 11, extending downward across the wind shield, the lower ends of which are bent toward the wind shield and in the ends thereof is placed a stopper 12 preferably made of rubber or cork, the said stopper functions also as a cushion and sound deadening means when contacting the glass as shown at C in Fig. 4.

Distributed along the side of the pipe, adjacent the wind shield is a plurality of apertures 13, functioning as jets, discharging the heated air or gases against the outer surface of the wind shield, the tendency of which is to prevent the accumulation of ice and snow or remove the same when deposited thereon.

It is now understood that the exhaust through the manifold will partially pass through the pipe system heretofore described and be controlled by a hand wheel 14 operating a gate valve or the like positioned at 15, the stem of the wheel extends through the instrument board as accessible means for the operator.

Should the pressure from the manifold become deficient at any time, it may be increased by a mechanism which I have provided and placed on the outlet end of the muffler tube 16, the said mechanism comprising a clutch band 17 bound firmly to the tube by a screw 18 and pivotally connected between the upwardly extending ends thereof is a lever 19 having a valve 20 attached thereto as closing means for the end of the tube. On the opposite end thereof is an eye 21 as attaching means for a rod or cord 22, the said rod or cord extending forward to a convenient place near the operator of the vehicle at which point there will be means to stationarily hold the cord to disengage the choke as desired as the tendency of the choke is to close by gravity.

Figure 5:
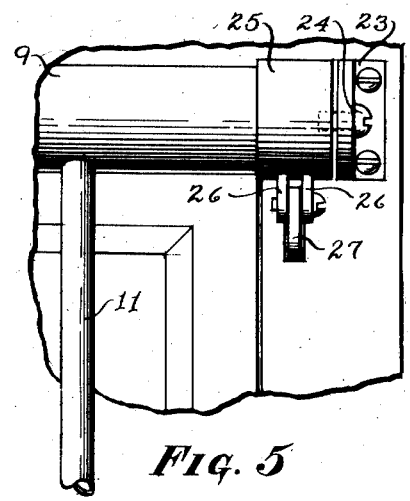
Fig. 5 is an enlarged view of the supply pipe and its end support and actuating means.
Figure 7:
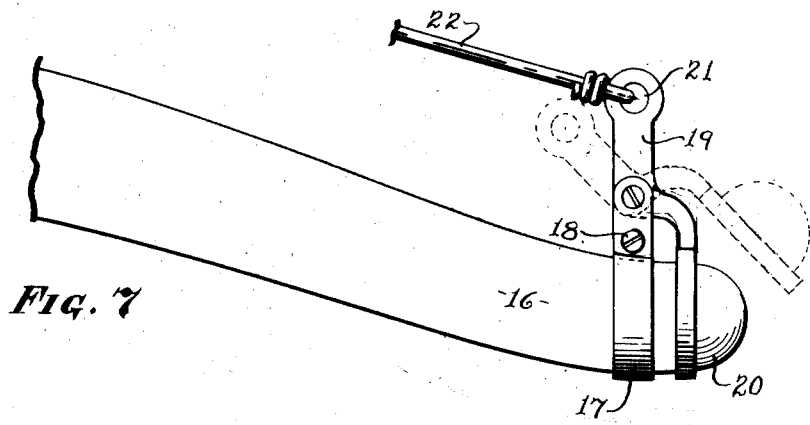
Fig. 7 is a view of the outlet end of the muffler showing the choke in position.

In Figs. 5 and 6 is shown a bracket 23 rigidly attached to the corner post of the vehicle, the said bracket functioning as a bearing in which the distribution pipe is trunioned by means of a screw 24 threadedly engaging a cap 25 which is rigidly attached to the end of said pipe 9 functioning also as closing means for the end of said pipe. Laterally extending from the cap are ears 26 in which a lever 27 pivotally engages as actuating means to rock the pipe so that the laterally extending pipes 11 connected thereto may be positioned horizontally or in close proximity to the wind shield visor 28.

As a means to prevent retraction of the pipes the notch 29 will engage with a detent 30 that is rigidly attached to the frame of the top, the movement required to rock the pipes outward is shown by dotted lines D and as a means to hold the pipes firmly with the windshield, the notch 31 is brought to engagement with the said detent.

The mechanism herein disclosed is designed not to interfere with the operation of a standard make of wind shield wiper manually or mechanically operated, the blade of which is shown at 32 in Figs. 1 and 2.

The laterally extending pipes 11 are shown in the drawings positioned in front of the driver exclusively, but I do not confine them to such position as they may continue to the opposite side of the wind shield in which event the union 8 will be placed in close proximity to the bend E of the pipe 3'. Such other modifications may be employed as lie within the scope of the appended claims.

Having thus described my invention, what I claim as new and desire to secure by Letters Patent is:

1. In a frost exterminating means for wind shields, a pipe connecting with the exhaust manifold of the engine, extending to and horizontally across the top of the wind shield, a swivel joint in the horizontal portion of the pipes so that the outer end thereof will rotate, a plurality of pipes laterally extending from the rotatable portion of the first said pipes, the last said pipes extending across the wind shield, the lower end of which is curved toward the wind shield, flexible stoppers to close the ends of last said pipes and simultaneously function as a cushion, a plurality of apertures distributed longitudinally along said pipes as ejecting means for the heated air or gas against the wind shield.

2. In a frost exterminating means for a wind shield, in combination with the exhaust manifold of the engine, a pipe connected with the manifold extending upward and having a right angle bend near the upper corner of the wind shield and rigidly connected to the frame supporting the wind shield, a valve positioned in the pipe so that the wheel thereof is positioned on the instrument board, a distribution pipe connected to the upper end of first said pipe by a union functioning as a swivel, a plurality of pipes laterally extending to eject warm air therefrom against the wind shield, means to rock the laterally extending pipes to and from the wind shield.

3. In a frost exterminating means for wind shields, a mechanism of the kind described, having a distribution pipe swivelly connected to the supply pipe, bracket pivotally supporting the opposite end of the distribution pipe, a lever pivotally connecting with the distribution pipe adjacent the bracket as rocking means for said pipe, a notch in the lever to bind the distribution to a fixed working position to the wind shield, a second notch in the lever to engage with the detent when the distribution pipe is rocked to disengagement from the wind shield.

In testimony whereof I affix my signature.

ALPHA D. UPDEGRAFF.